United States Patent [19]

Bradley

[11] 4,416,467
[45] Nov. 22, 1983

[54] TOWING COUPLINGS

[75] Inventor: Harry S. Bradley, Bradford, England

[73] Assignee: H. & K. Bradley (Trailer Equipment) Limited, Bingley, England

[21] Appl. No.: 298,100

[22] Filed: Aug. 31, 1981

[30] Foreign Application Priority Data

Sep. 6, 1980 [GB] United Kingdom ............... 8028862

[51] Int. Cl.³ .............................................. B60D 1/06
[52] U.S. Cl. ................................................. 280/512
[58] Field of Search ............... 280/512, 511; 403/141, 403/143, 122, 316, 317

[56] References Cited

FOREIGN PATENT DOCUMENTS 1605981 12/1970 Fed. Rep. of Germany ...... 280/512
2245087 4/1974 Fed. Rep. of Germany ...... 280/512
301388 4/1929 United Kingdom .

Primary Examiner—John A. Pekar
Assistant Examiner—D. Lynn Fugate
Attorney, Agent, or Firm—LeBlanc, Nolan, Shur & Nies

[57] ABSTRACT

The invention relates to towing couplings of a type comprising a fixed part and a moveable keeper which are together adapted to clamp on a tow-ball when the keeper is in a locking position but which are adapted to release the tow-ball when the keeper is moved to an unlocking position. A towing coupling according to the invention has a cam engaged with the keeper, a single spring urging the keeper away from its locking position into engagement with the cam, the spring also urging the cam in the direction of motion which causes it to apply a force to the keeper urging the keeper towards the locking position, and a lever connected to the cam for moving the latter against the action of the spring to allow the keeper to move away from the locking position.

22 Claims, 5 Drawing Figures

TOWING COUPLINGS

The invention relates to towing couplings and more particularly, but not exclusively, to tow-ball couplings for use on trailer vehicles.

A known type of towing coupling comprises a fixed part and a moveable keeper which are together adapted to clamp on a tow ball when the keeper is in a locking position, but which are adapted to release the tow-ball when the keeper is in an unlocking position. The keeper is urged into the unlocking position by a first spring means. A cam is provided on the known type of towing coupling, and the cam is urged into engagement with the moveable keeper by a second spring means, the cam thereby urging the keeper into the locking position. When the cam is moved away from the fixed part the moveable keeper is able to move away from the fixed part into the unlocking position under the action of the first spring means. An operating lever is connected to the cam so that operation of the lever controls the movement of the cam to thereby control the movement of the keeper to and from the locking and the unlocking position.

It will be appreciated that a tow-ball can be connected to the known type of towing coupling by operating the lever to move the cam away from the fixed part and to allow the keeper to move under the action of the spring means into the unlocking position, inserting the tow-ball between the fixed part and the keeper, and then operating the lever to move the cam towrds the fixed part to thereby urge the keeper into the locking position so that the tow-ball is clamped between the fixed part and the moveable keeper.

The present invention seeks to provide a towing coupling which is of improved construction compared with the known type of towing coupling to facilitate the connection and disconnection of the towing coupling and a tow-ball.

The invention provides a towing coupling for a trailer vehicle comprising a fixed part and a moveable keeper which together are adapted to clamp on a tow ball when the keeper is in a locking position, but to release the tow ball when the keeper is in an unlocked position, there being a cam engaged with the keeper, single spring means urging the keeper away from the locking position and into engagement with the cam and also urging the cam in the direction of motion which causes it to apply a force to the keeper urging the keeper towards the locking position, and lever means connected to the cam for moving the cam against the loading of the single spring means to allow the keeper to move away from the locking position.

Preferably, the single spring means is connected between the lever means and the keeper and is so arranged that the force it applies to the lever means is transmitted by the lever means to the cam.

Preferably, also, the keeper and the cam are so arranged that the line of action of force applied by the ball to the keeper due to any tendency of the ball to escape from the coupling passes through the region of engagement of the keeper and the cam. The cam may be pivotally mounted on an axle, the line of action of force applied by the ball to the keeper due to any tendency of the ball to escape from the coupling passing through the cam pivot axle.

Preferably, the cam is attached to the lever means for movement therewith and the cam may be pivotally connected to the lever means. The cam may also be pivotally connected to the fixed part.

The keeper may have a decoupling portion which is arranged during movement of the keeper away from the locking position, to project into the space defined between the fixed part and the keeper when the keeper is in the locking position, to facilitate the release of the ball from the coupling. The keeper may be pivotally connected to the fixed part, for example, by means of a pivot pin.

Preferably, interengageable portions of the lever means and the fixed part limit the extent of movement of the lever means relatively to the fixed part. The lever means may incorporate a guide member which is engageable with a guide surface connected to the fixed part. A projection may be connected to the fixed part and housed in a guide slot formed in the lever means, the projection being engageable with the lever means to limit the extent of movement of the latter relatively to the fixed part. The projection may comprise the pivot pin which pivotally connects the keeper to the fixed part.

Preferably, the fixed part forms part of a coupling housing which is arranged to be releaseably secured to a towing vehicle. The fixed part may be substantially arcuate.

It is preferred that an end face or edge of the lever means is engageable with a forward or a rearward abutment formed on, or connected to the coupling housing, to limit the extent of movement of the lever means relatively to the fixed part. The forward abutment may comprise an end face or edge of the fixed part, and the rearward abutment may comprise a rib or flange formed on the coupling housing. The forward and/or rearward limits of the extent of movement of the lever means relatively to the fixed part imposed by the engagement of an end face or edge of the lever means with the forward or rearward abutments correspond respectively to the unlocking and locking positions of the keeper.

A catch means may be provided to restrict the lever means from pivoting relatively to the fixed part, the catch means being manually releaseable to allow the lever means to pivot relatively to the fixed part.

The invention includes a method of operating a towing coupling as hereinbefore described comprising pivoting the lever means relatively to the fixed part to disengage interengageable portions of the lever means and the fixed part. The method may further comprise lifting the lever means relatively to the fixed part. The lever means may be pivoted after, or as the lever means is lifted relatively to the fixed part, until the lever means engages with the fixed part. When the lever means is pivoted a portion of the keeper may be moved within the space defined between the fixed part and the keeper when the keeper is in the locking position, to facilitate the release of the tow-ball from the coupling.

A catch means may be released prior to the pivoting of the lever means relatively to the fixed part to disengage interengageable portions of the lever means and the fixed part.

One embodiment of a towing coupling according to the invention will now be described by way of example only, with reference to the accompanying drawings of which:

Figure 1:
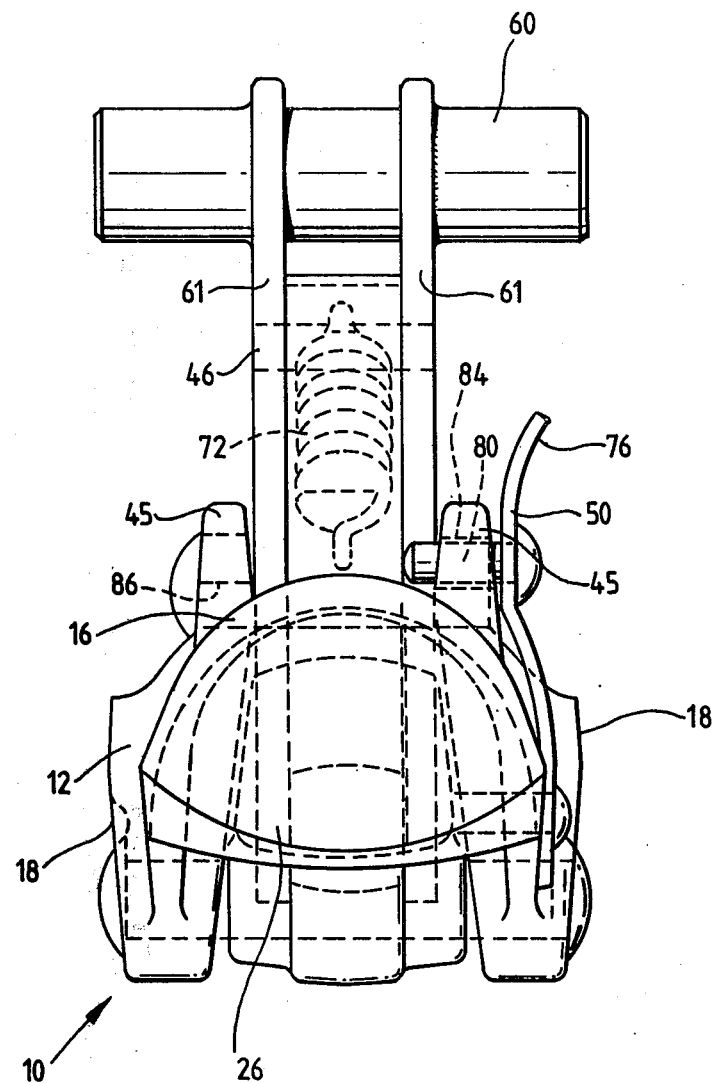
FIG. 1 is a front elevation of a towing coupling according to the invention.

A cast iron or forged steel towing coupling is indicated generally at 10 and comprises a coupling housing 12 having an operating mechanism 14 connected thereto.

The coupling housing 12 is of an inverted U-shape in end cross-section and has an upper wall 16 from each side of which depends on elongate side wall 18. The forward end 20 and the underside 22 of the coupling housing 12 are open giving access to the channel 24 formed within the housing. The rear end of the channel 24 is closed by a rounded nose 26, the inner surface 28 of which is part-hemispherical.

The operating mechanism 14 comprises a keeper 30 which is pivotally connected to the housing 12 by means of a pivot pin 32 bridging the side walls of the housing. The rear end 31 of the keeper 30 is part-hemispherical and is arranged to co-act with the inner surface 28 of the nose 26 to engage on, and clamp a tow-ball 34 therebetween when the coupling 10 is in an operative position as shown in FIG. 1. Towing couplings adapted to clamp on to a towing ball in this manner are known. When the operating mechanism 14 is actuated to bring the coupling 10 into the release position shown in FIG. 5, the keeper 30 moves away from the nose 26 turning about its pivot 32 to enable the tow-ball 34 to be released from the coupling 10.

Figure 4:
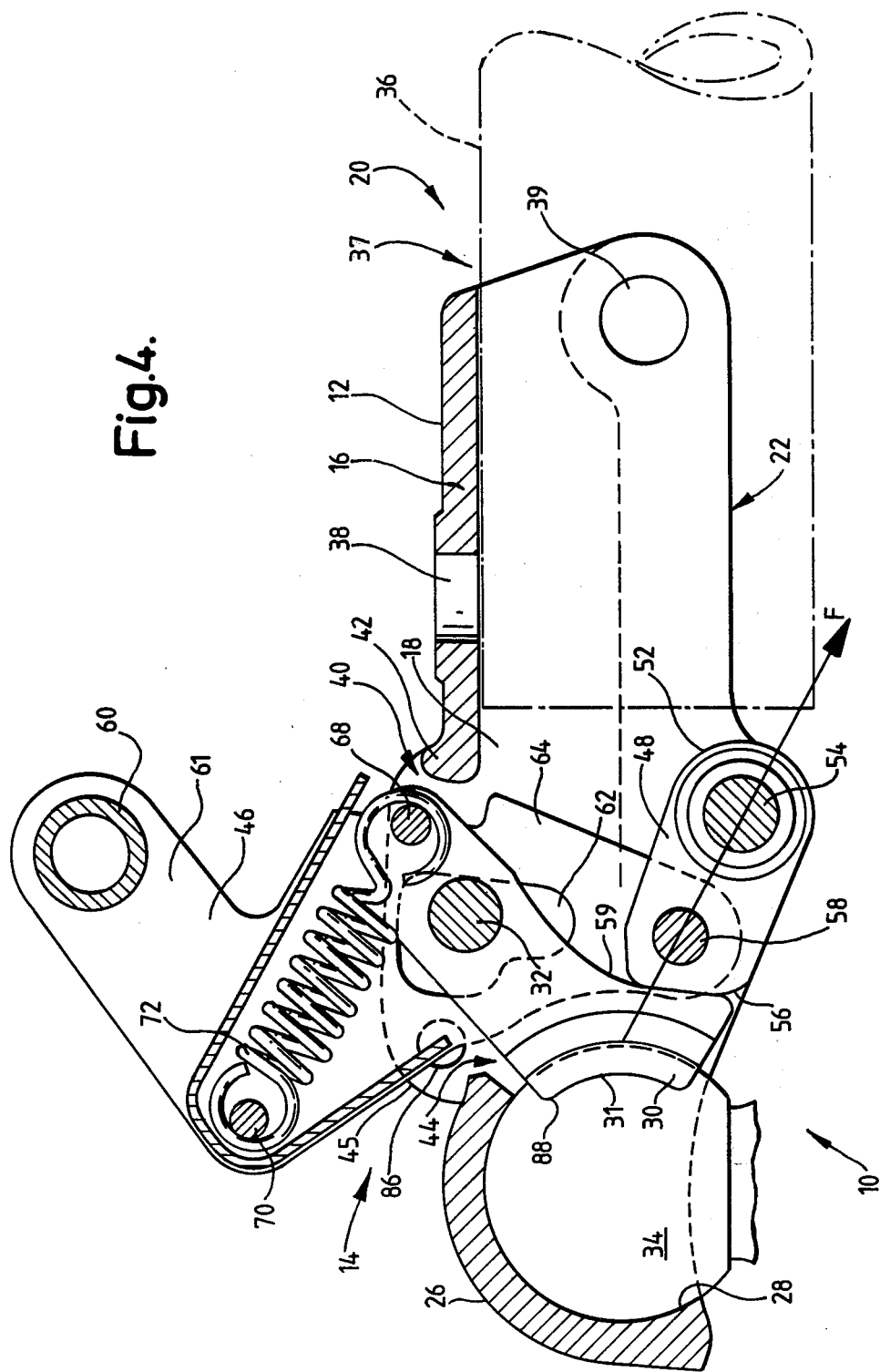
FIG. 4 is a cross-sectional side elevation of the towing coupling shown in FIG. 1, in a position in which it is partly released.

The forward end 20 of the coupling housing 12 is arranged to receive a towing arm 36 of a towing vehicle (not shown), through the open forward end 37 thereof as indicated in chain-dotted lines in FIG. 4. A first hole 38 is formed through the upper wall 16 of the housing 12 and two second holes 39 are formed one through the forward end of each side wall 18 of the housing 12. The holes 38 and 39 are each arranged to receive a bolt (not shown) by means of which the towing arm 36 can be secured to the coupling 10.

An elongate slot 40 is formed longitudinally in a central part of the upper wall 16. A flange 42 is formed across the forward end of the slot 40 and a rounded upper rib 44 on the forward end of the nose 26 extends across the rear end of the slot 40. The side walls of the housing extend upwardly along each side of the slot 40 to form guide flanges 45 between which the upper portion of the operating mechanism 14 is arranged to move.

The operating mechanism 14 which incorporates the keeper 30 is connected to the central part of the coupling housing 12 and projects upwardly through the slot 40 between the guide flanges 45. The operating mechanism 14 further comprises an operating lever 46, a cam 48 and a safety catch 50. The cam 48 is connected at one end 52 to a lower part of the housing 12 by means of a pivot bolt 54 bridging the side walls 18 of the housing 12, and at the other end 56 it is pivoted to the lower end of the lever 46 by means of a pivot peg 58. Thus, the lever 46 and the cam 48 together form a linkage. The said other end 56 of cam 48 is smoothly curved to provide a cam surface which is arranged to engage on a smoothly curved arcuate forward face 59 of the keeper 30.

Figure 2:
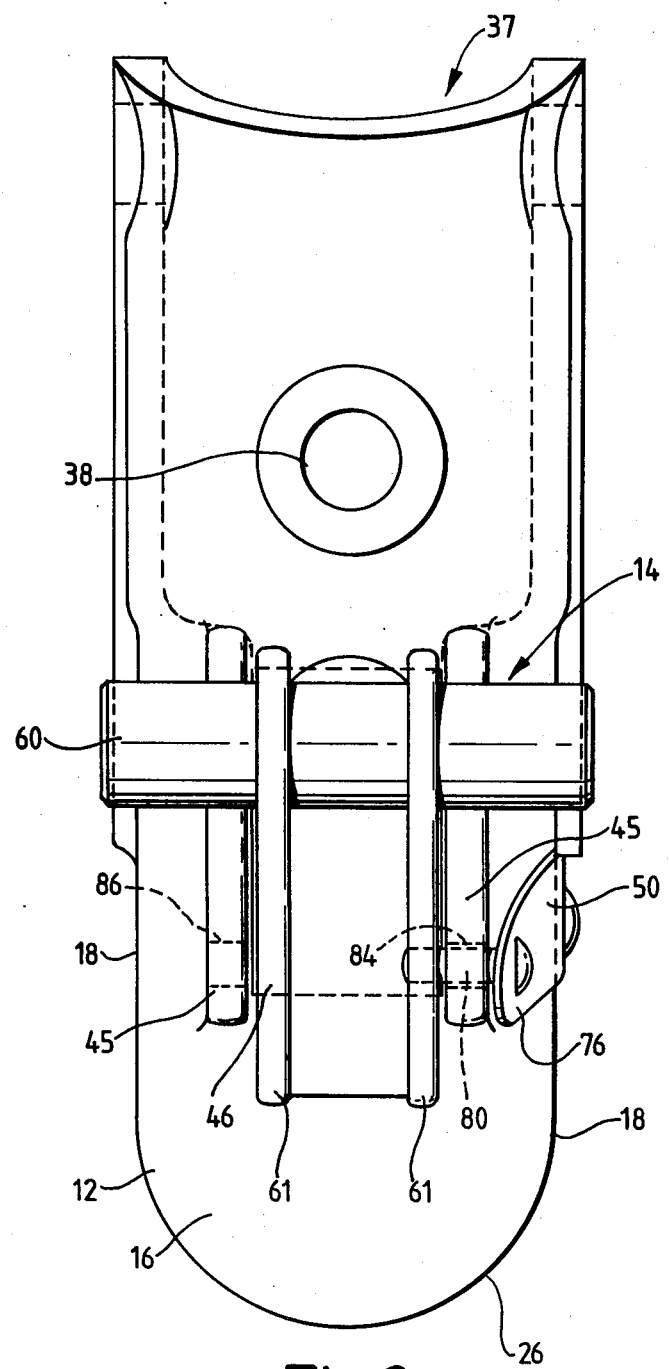
FIG. 2 is a plan view of the coupling shown in FIG. 1.

The lever 46 is formed of two identical arms 61 as cleary shown in FIGS. 1 and 2. The two arms 61 of the lever 46 are each located at an associated one side of the keeper 30 and the cam 48 adjacent to a respective one of the side walls 18 of the housing 12. The two arms 61 of the lever are joined together at their upper ends by a cylindrical handle 60 which is secured to each of the arms 61 and projects outwardly from each arm 61 to facilitate gripping of the handle 60. In addition, the pivot peg 58 is secured to the lower end of each arm 61 to bridge the lower ends and secure them together.

An inverted "L"-shaped slot 62 is formed in a central portion of each arm 61 of the lever 46, the slots 62 being in registration with each other. The pivot pin 32 passes through each slot 62 so that the lever 46 is captive on the pin 32 but is capable of pivotal and limited sliding movement relatively thereto. The extent of movement of the lever 46 relatively to the keeper 30 is limited by the engagement of the edges of the slots 62 with the pin 32.

A lug 66 is formed on, and projects upwardly from the forward end of the keeper 30. A first mounting pin 68 is secured to the lug 66 and a second mounting pin 70 is secured to and bridges the two arms 61 of the lever 46 at the mid-portion of the rear end thereof. A tension spring 72 extends between the first and second mounting pins 68 and 70 (on the lever 46), and the first mounting pin 68 is free to move on the lug 66 between the arms 61 of the lever 46. The spring 72 tends to turn the keeper 30 in an anticlockwise direction as seen in the drawings so that the forward face 59 of the keeper is urged into engagement with the end 56 of the cam 48, and away from the nose 26.

The safety catch 50 comprises a spring steel arm 76 (see FIGS. 1 and 2) which is rivetted at its lower end to the outside of the housing 12 and a peg 80 is rivetted to the arm 76 adjacent to its upper end. The peg 80 is normally urged by the inherent spring character of the arm 76 into engagement with a small hole 84 formed in one guide flange 45 of the housing 12 immediately above the rear end of the slot 40 and adjacent to the rib 44.

The peg 80 extends through the hole 84 and projects across the upper rear end of the slot 40 providing a stop against which the rear end of the lever 46 is arranged to engage in order to limit the extent of anticlockwise movement of the lever 46 in the slot 40. The upper end of the arm 76 can, however, be urged manually outwardly from the housing 12 against its own inherent spring character to enable the peg 80 to slide into the hole 84 away from the lever 46, and the upper end of the arm 76 is turned outwardly from the housing 12 to facilitate the movement of the upper end of the arm 76 away from the housing. Once the peg 80 is withdrawn clear of the rear edge of the lever 46 into the hole 84, the lever is free to pivot anticlockwise past the peg 80 and rearwardly of the slot 40 from the position shown in FIG. 3, until the rear end of the lever engages with the rib 44 as shown in FIG. 5, the rib then preventing any further movement of the lever 46.

A further hole 86 is formed through the other guide flange 45 immediately opposite and substantially in registration with the hole 84. If required, a padlock (not shown) can be secured through the further hole 86 and locked to ensure that the lever 46 is unable to move forwardly of the slot 40 due to the engagement of the lever with the padlock. The padlock (not shown) can thus be used to provide a security lock for the coupling 10 to prevent an unauthorized person from operating the mechanism 14 of the coupling 10.

Figure 3:
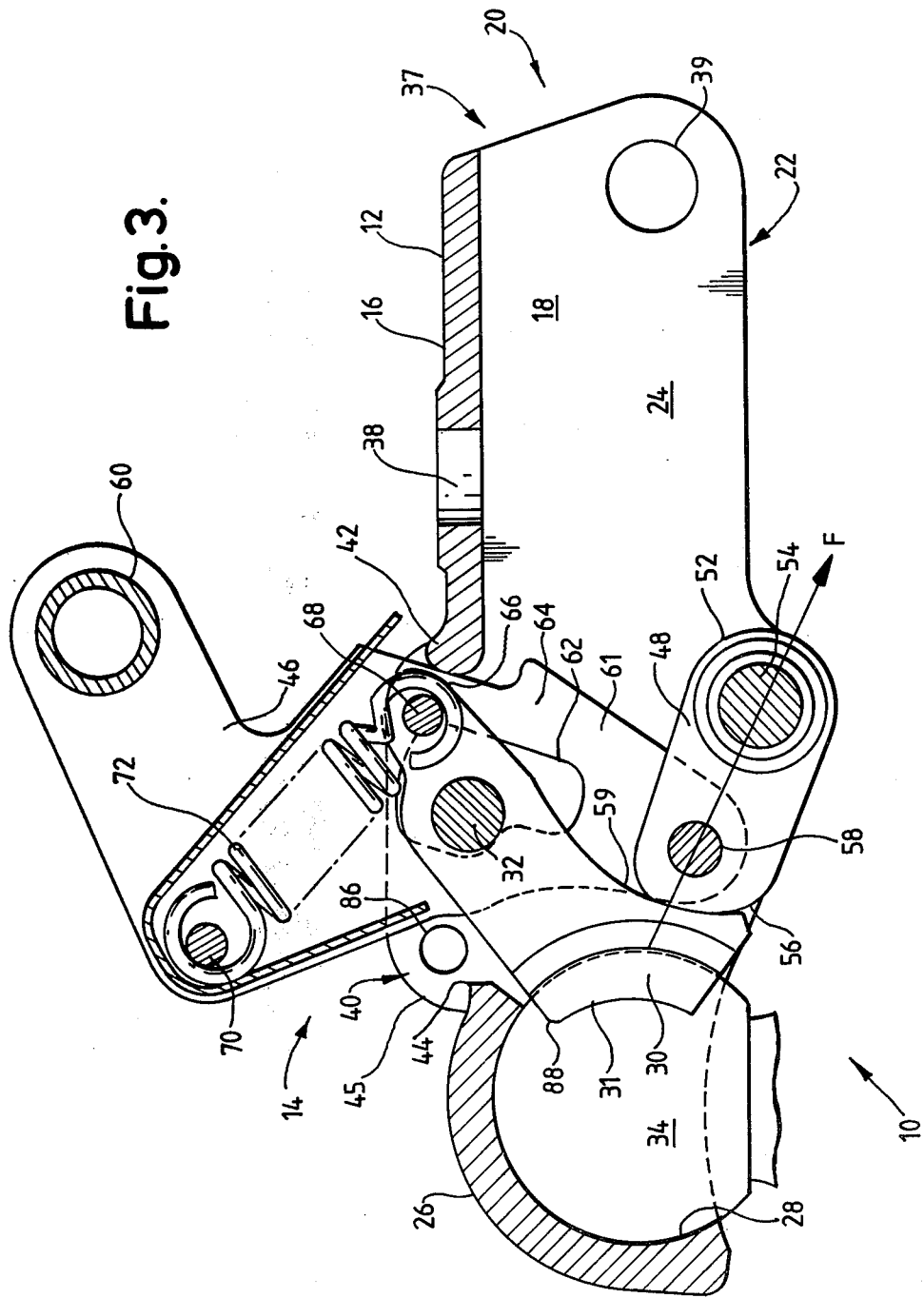
FIG. 3 is a cross-sectional side elevation of the towing coupling shown in FIG. 1 in an operative position.
Figure 5:
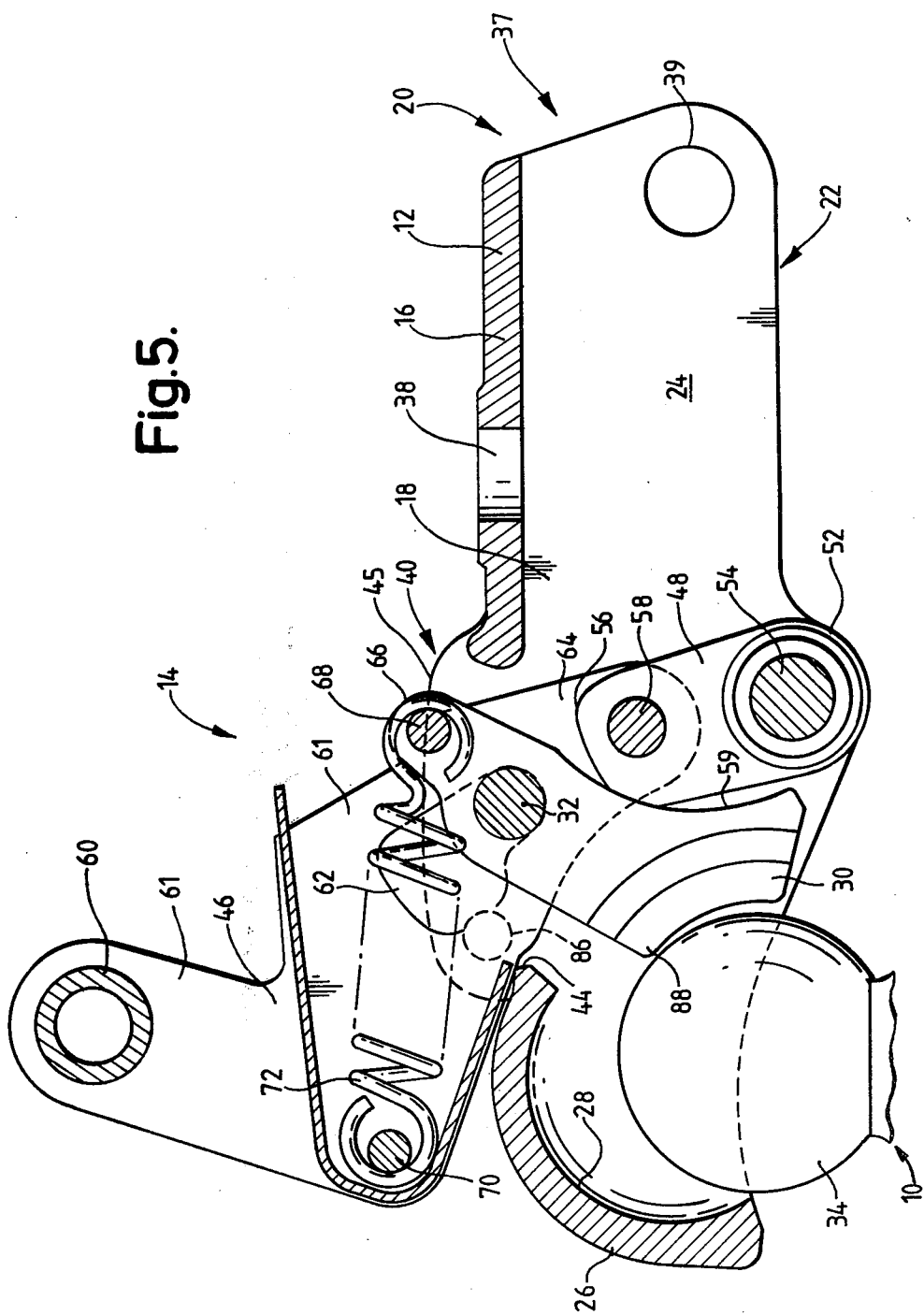
FIG. 5 is a cross-sectional side elevation of the towing coupling shown in FIG. 1, in a fully released position.

The anticlockwise movement of the lever 46 is successively charted in FIGS. 3, 4 and 5 of the drawings. Since the pin 32 is housed within the slots 62 the movement of the lever 46 is dictated by the restrictions imposed on its movement by the engagement of the sides of the slots 62 with the pin 32. Also, as seen in FIG. 3, the engagement of the pin 32 with the lower edges of the horizontal portions of the slots 62 restricts the initial upward movement of the lever 46 from the operative position. This ensures that the lever must be pivoted anticlockwise before it can be raised relatively to the pin 32. The lever is thereby restricted from being raised accidentally, for example, by vibrational forces exerted on the housing by the towing or trailer vehicles which could lead to release of the tow-ball 34 from the housing 12. As will be clear from FIGS. 3, 4 and 5 of the drawings, for release of the tow-ball 34 from the housing 12, the lever must firstly be turned anticlockwise (as seen in the drawings) on the pivot peg 58 with the cam 48 remaining stationary until the pin 32 engages with the forward edges of the slots 62 (see FIG. 4). Then the lever 46 can be raised bodily relatively to the pin 32 against the action of the spring 72. This upward motion of the lever 46 has the effect of turning the cam 48 in a clockwise direction. Further anticlockwise movement of the lever 46 which is then possible causes further upward pivotal movement of the cam 48 to the position shown in FIG. 5. As the cam 48 pivots upwardly the curved surface on the end 56 of the cam travels over the smoothly curved forward face 59 of the keeper 30 which is urged forwardly against the end 56 of the cam 48 by the tension spring 72. Since the end 56 of the cam 48 moves forwardly, the keeper is allowed to turn in an anticlockwise direction about the pin 32 so that its lower part moves away from the nose 26 to release the tow-ball 34 from between the nose 26 and the keeper. As the upper part of the lever 46 approaches its most rearward position, the upper rear edge 88 of the keeper is forced downwardly into engagement with the tow-ball 34 to eject the latter from the housing 12, as clearly shown in FIG. 5.

In order to connect a tow-ball 34, to the housing 12, the catch 50 is released and the upper part of the lever 46 is moved rearwardly as previously described, until the keeper 30 is pivoted fully away from the nose 26 in the release position shown in FIG. 5. The tow-ball 34 is then inserted between the nose 26 and the keeper 30 until it engages with the part-hemispherical surfaces of the nose and the keeper. The lever 46 is then allowed to turn in a clockwise direction and to descend under the action of the spring 72 until it once again returns to its normal operative position shown in FIG. 3, at which time the connection between the lever and the cam is such that the end 56 of the cam 48 is forced into engagement with the forward face 59 of the keeper 30, to push the keeper rearwardly to clamp the tow-ball 34 between the nose 26 and the keeper. As the lever 46 moves clockwise, the peg 80 which is urged by the arm 76 of the catch onto the surface of the adjacent arm 61 engages with that surface until the rear edge of the lever clears the peg 80, at which time the peg 80 slides under the spring action of the arm 76 through the hole 84 and returns to its operative position in which it acts as a stop to restrict anticlockwise movement of the lever 46. Thus, the arm 76 and peg 80 when in the operative position together provide a safety catch to prevent accidental operation of the mechanism 14 to release the tow-ball 34 due to, for example, vibration of the coupling.

It will be appreciated that the spring 72 urges the lever into its operative position to thereby ensure that the cam 48 pushes the keeper rearwardly so that the tow-ball 34 is clamped between the nose 26 and the keeper. The spring 72 thus acts to restrict accidental release of the tow-ball 34 from the coupling, the spring 72 urging the coupling into the operative position shown in FIG. 3. It will also be noted that unlike conventional towing couplings the towing coupling 10 according to the present invention only incorporates a single spring means, namely the tension spring 72 to urge the mechanism 14 into the operative position shown in FIG. 3 and also to provide the force for clamping the tow-ball 34 within the housing 12. Conventional towing couplings use two or even more springs to obtain the same results.

A useful feature of the coupling 10 is that the line of action of the force (indicated by arrow F in FIGS. 3 and 4 of the drawings) applied by the tow-ball 34 to the keeper 30, due to any tendency of the ball to escape from the coupling, passes not only through the region of engagement of the keeper and the cam 48 but also passes through the pivot bolt 54 on which the cam 48 is mounted. There is therefore no turning moment applied by the ball and/or the keeper to the cam. The cam thus provides a rigid member to absorb the said force to positively retain the tow-ball 34 within the housing 12 until such time as the safety catch 50 is released and the lever 46 is turned and lifted to disengaged the tow-ball from the housing.

I claim:

1. A towing coupling for a trailer vehicle comprising:
   a fixed part and a moveable keeper, which together are adapted to clamp on a tow ball when the keeper is in a locking position, but to release the tow ball when the keeper is in an unlocking position;
   a cam engaged with the keeper;
   single spring means urging the keeper away from the locking position and into engagment with the cam and also urging the cam in the direction of motion which causes it to apply a force to the keeper urging the keeper towards the locking position; and
   lever means mechanically linked to the cam for moving the cam against the loading of the single spring means to allow the keeper to move away from the locking position.

2. A towing coupling as claimed in claim 1, in which the single spring means is connected between the lever means and the keeper and is so arranged that the force it applies to the lever means is transmitted by the lever means to the cam.

3. A towing coupling as claimed in claim 1, in which the keeper and the cam are so arranged that the line of action of force applied by the ball to the keeper due to any tendency of the ball to escape from the coupling passes through the region of engagement of the keeper and the cam.

4. A towing coupling as claimed in claim 1, in which the cam is pivotally mounted on an axle and the line of action of force applied by the ball to the keeper due to any tendency of the ball to escape from the coupling passes through the cam pivot axle.

5. A towing coupling as claimed in claim 1, in which the cam is secured to the lever means for movement therewith.

6. A towing coupling as claimed in claim 5, in which the cam is pivotally connected to the lever means.

7. A towing coupling as claimed in claim 1, in which the cam is pivotally connected to the fixed part.

8. A towing coupling as claimed in claim 1, in which the keeper has a decoupling portion which is arranged during movement of the keeper away from the locking position to project into the space defined between the fixed part and the keeper when the keeper is in the locking position to facilitate the release of the ball from the towing coupling.

9. A towing coupling as claimed in claim 1, in which the keeper is pivotally connected to the fixed part.

10. A towing coupling as claimed in claim 9, in which the keeper is pivotally connected to the fixed part by means of a pivot pin.

11. A towing coupling as claimed in claim 1, in which interengageable portions of the lever means and the fixed part limit the extent of movement of the lever means relatively to the fixed part.

12. A towing coupling as claimed in claim 11, in which the lever means incorporates a guide member which is engageable with a guide surface connected to the fixed part.

13. A towing coupling as claimed in claim 11, in which a projection is connected to the fixed part and is housed in a guide slot formed in the lever means, the projection being engageable with the lever means to limit the extent of movement of the latter relatively to the fixed part.

14. A towing coupling as claimed in claim 13, in which the projection comprises a pivot pin which pivotally connects the keeper to the fixed part.

15. A towing coupling as claimed in claim 1, in which the fixed part forms part of a coupling housing which is arranged to be releaseably secured to a towing vehicle.

16. A towing coupling as claimed in claim 1, in which the fixed part is substantially arcuate.

17. A towing coupling as claimed in claim 15, in which an end face or edge of the lever means is engageable with a forward or a rearward abutment formed on, or connected to the coupling housing, to limit the extent of movement of the lever means relatively to the fixed part.

18. A towing coupling as claimed in claim 17, in which the forward abutment comprises an end face or edge of the fixed part.

19. A towing coupling as claimed in claim 18, in which the rearward abutment comprises a rib or flange formed on the coupling housing.

20. A towing coupling as claimed in claim 17, in which the forward and/or rearward limit of the extent of movement of the lever means relatively to the fixed part imposed by the engagement of an end face or edge of the lever means with the forward or rearward abutment corresponds respectively to the unlocking and locking positions of the keeper.

21. A towing coupling as claimed in claim 1, in which catch means is provided to restrict the lever means from pivoting relatively to the fixed part, the catch means being manually releaseable to allow the lever means to pivot relatively to the fixed part.

22. A towing coupling as claimed in claim 1, including a handle which is connected to the lever means and controls directly movement of the keeper towards and away from the locking position.

* * * * *